United States Patent
Abusleme

(10) Patent No.: US 12,043,681 B2
(45) Date of Patent: Jul. 23, 2024

(54) HIGHLY FLEXIBLE VDF POLYMER

(71) Applicant: SOLVAY SPECIALTY POLYMERS ITALY S.P.A., Bollate (IT)

(72) Inventor: Julio A. Abusleme, Saronno (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 554 days.

(21) Appl. No.: 17/312,031

(22) PCT Filed: Dec. 19, 2019

(86) PCT No.: PCT/EP2019/086190
§ 371 (c)(1),
(2) Date: Jun. 9, 2021

(87) PCT Pub. No.: WO2020/127651
PCT Pub. Date: Jun. 25, 2020

(65) Prior Publication Data
US 2022/0041772 A1   Feb. 10, 2022

(30) Foreign Application Priority Data

Dec. 21, 2018 (EP) .................... 18215070

(51) Int. Cl.
*C08F 214/22* (2006.01)
*C08F 214/24* (2006.01)
*C08F 214/28* (2006.01)
*C08F 220/20* (2006.01)
*C08J 5/18* (2006.01)

(52) U.S. Cl.
CPC ............. *C08F 214/225* (2013.01); *C08J 5/18* (2013.01); *C08F 214/24* (2013.01); *C08F 214/285* (2013.01); *C08F 220/20* (2013.01); *C08F 2800/20* (2013.01); *C08J 2327/16* (2013.01)

(58) Field of Classification Search
None
See application file for complete search history.

(56) References Cited

U.S. PATENT DOCUMENTS

| 4,016,345 | A | 4/1977 | Holmes |
| 4,725,644 | A | 2/1988 | Malhotra |
| 6,479,591 | B2 | 11/2002 | Kapeliouchko et al. |
| 2005/0079406 | A1* | 4/2005 | Daido ............ H01M 50/44 429/231.95 |
| 2010/0133482 | A1* | 6/2010 | Abusleme ........ B01D 71/76 252/511 |

FOREIGN PATENT DOCUMENTS

| EP | 1621573 A1 | 2/2006 |
| EP | 2762538 A1 | 8/2014 |
| JP | 60023688 B2 | 6/1985 |
| JP | 2000313839 A | 11/2000 |
| WO | 2008129041 A1 | 10/2008 |
| WO | 2012084578 A1 | 6/2012 |

OTHER PUBLICATIONS

ASTM D3418-08—Standard Test Method for Transition Temperatures and Enthalpies of Fusion and Crystallization of Polymers by Differential Scanning Calorimetry, 2008, 7 pages.

* cited by examiner

*Primary Examiner* — Richard A Huhn
(74) *Attorney, Agent, or Firm* — Osha Bergman Watanabe & Burton LLP

(57) ABSTRACT

The present invention pertains to vinylidene fluoride copolymers comprising recurring units derived from chlorotrifluoroethylene and from a (meth)acrylic monomer having improved flexibility, to a process for their manufacture, and to their use in applications where outstanding flexibility is required.

15 Claims, No Drawings

HIGHLY FLEXIBLE VDF POLYMER

CROSS-REFERENCE TO RELATED APPLICATIONS

This application is a U.S. national stage entry under 35 U.S.C. § 371 of International Application No. PCT/EP2019/086190 filed Dec. 19, 2019, which claims priority to European application No. 18215070.6, filed on Dec. 21, 2018. The entire contents of these applications are explicitly incorporated herein by this reference.

TECHNICAL FIELD

The present invention pertains to vinylidene fluoride copolymers comprising recurring units derived from chlorotrifluoroethylene and from a (meth)acrylic monomer having improved flexibility, to a process for their manufacture, and to their use in applications where outstanding flexibility is required.

BACKGROUND ART

Fluoropolymers are known in the art to be excellent materials used in a variety of applications and environments due to their intrinsic chemical resistance and good mechanical properties.

Polyvinylidene fluoride (PVDF) is a polymer which is known, in particular, for its high chemical stability, which is associated with an excellent mechanical strength.

Nevertheless, PVDF presents the disadvantage of lacking high flexibility, and this limits its use in fields where this property is required, such as, for example, in secondary batteries.

It is known to improve the flexibility of PVDF by incorporation of monomer units derived from halogenated comonomers such as, for example, chlorotrifluoroethylene.

Japanese patent JP60023688 (Kureha) discloses the manufacture of homogeneous thermoplastic copolymers of vinylidene fluoride (VDF) and of chlorotrifluoroethylene (CTFE), containing an amount ranging from 2 to 15% by weight of chlorotrifluoroethylene, by copolymerisation with delayed and modulated injection of CTFE into all of the VDF, so as to take into account the relative reactivity of VDF and of CTFE. The resulting homogeneous copolymers exhibit a flexibility which is increased when compared with PVDF, but their melting temperature is markedly lower than that of PVDF, and this constitutes a serious disadvantage.

Flexible copolymers of VDF are used as coating of polyolefin porous films separators of lithium ion batteries. Copolymers of VDF are also suitable as binders for electrodes in view of their good adhesion properties to the current collector. In those applications, vinylidene fluoride copolymers coating should remain unchanged despite the high temperatures peaks during battery operation, so high melting point and flexible copolymers of VDF are desired to avoid any damage to those battery components.

Flexible copolymers of VDF find application also in several other fields, such as in Chemical Processing Industry, in pipes and in architectural coating.

In some cases a very flexible copolymers of VDF would be required, especially flexible at low temperatures where cracks could appear due to its high crystallinity.

Moreover, in several applications such as coating applications, it is desirable to have flexible copolymers of VDF dissolved in organic solvents at low temperatures.

As it is well known, the fluorinated monomers used in the preparation of copolymers of VDF have each a different reactivity in the polymerization processes, some of them having a very low reactivity. In particular, the VDF monomers are easily recovered due to the physical properties of the same, CTFE monomers are practically all consumed, but for fluoroolefins like perfluoromethylvinylether (MVE) or hexafluoropropylene (HFP) the yields are in general much lower and about 30 to 50% of the charged monomer remains unreacted.

This behaviour leads to the fact that the excess of unreacted monomers has to be burnt at the end of the reaction, reducing the process productivity.

Copolymers of VDF characterized by a very high flexibility, high melting point, and solubility in organic solvents at low temperature produced by improved and sustainable processes are thus needed.

SUMMARY OF INVENTION

The Applicant has now surprisingly found that when combining in a VDF-based polymer recurring units derived from chlorotrifluoroethylene, from a (meth)acrylic monomer and from at least a third fluorinated monomer, it is advantageously possible to significantly improve flexibility and solubility in certain non-toxic solvents of VDF-based polymer, the same being obtainable by an improved and sustainable polymerization process.

Therefore, a first object of the present invention is a semi-crystalline vinylidene fluoride (VDF) copolymer [polymer (A)] comprising:
- (a) recurring units derived from vinylidene fluoride (VDF);
- (b) recurring units derived from chlorotrifluoroethylene (CTFE);
- (c) recurring units derived from at least one hydrophilic (meth)acrylic monomer (MA) of formula (I):

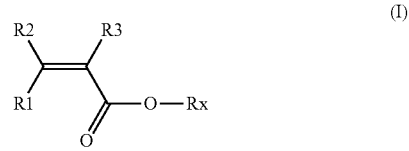

wherein each of R1, R2, R3, equal or different from each other, is independently an hydrogen atom or a $C_1$-$C_3$ hydrocarbon group, and Rx is a hydrogen or a $C_1$-$C_5$ hydrocarbon moiety optionally comprising at least one functional group; and
- (d) recurring units derived from one or more fluorinated comonomers (F) different from vinylidene fluoride and from chlorotrifluoroethylene;

wherein the total amount of recurring units b) is comprised between 6% and 25% by weight with respect to the total weight of recurring units of polymer (A) and the total amount of recurring units d) is comprised between 0.5% and 4% by weight with respect to the total weight of recurring units of polymer (A).

In a second object of the present invention it is provided a process for the preparation of polymer (A) as above detailed by polymerization of a VDF monomer, at least one hydrogenated (meth)acrylic monomer (MA), a CTFE monomer and at least one comonomer (F), either in suspension or in emulsion.

Due to the low amount of fluorinated copolymer (F) in polymer (A), of at most 4% by weight with respect to the total weight of recurring units of polymer (A), the process of the present invention advantageously terminates with a low amount of unreacted residue fluorinated copolymer (F) to be burnt. The process of the invention thus allows reducing the waste of unreacted monomers and the costs associated with their burning, resulting in a more sustainable process.

In a third object, the present invention provides a composition [composition (C)] comprising:
one or more polymer (A) of the invention, and
a liquid medium comprising one or more organic solvents.

The present invention also provides a process for manufacturing a film, said process comprising:
(1a) providing the composition (C) of the invention, and
(2a) processing, typically by casting, the composition (C) provided in step (1a) into a film.

DESCRIPTION OF EMBODIMENTS

By the term "recurring unit derived from vinylidene fluoride" (also generally indicated as vinylidene difluoride 1,1-difluoroethylene, VDF), it is intended to denote a recurring unit of formula $CF_2=CH_2$.

The term "semi-crystalline" is intended to denote a vinylidene fluoride (VDF) polymer having a detectable melting point. It is generally understood that a semi-crystalline VDF polymer has a heat of fusion of advantageously at least 0.4 J/g, preferably of at least 0.5 J/g, more preferably of at least 1 J/g, as measured according to ASTM D 3418.

By the term "recurring units derived from chlorotrifluoroethylene" it is intended to denote a recurring unit of formula $CF_2=CFCl$.

Polymer (A) of the present invention has notably an intrinsic viscosity of at most 0.50 l/g, preferably of at most 0.45 l/g, more preferably of at most 0.25 l/g, still more preferably of at most 0.20 l/g.

Polymer (A) of the present invention has notably an intrinsic viscosity of at least 0.05 l/g, preferably of at least 0.08 l/g, more preferably of at least 0.15 l/g, still more preferably of at least 0.10 l/g.

The intrinsic viscosity of polymer (A) is typically measured at 25° C. in N,N-dimethylformamide.

The term "at least one hydrophilic (meth)acrylic monomer (MA)" is understood to mean that the polymer (A) may comprise recurring units derived from one or more than one hydrophilic (meth)acrylic monomer (MA) as above described. In the rest of the text, the expressions "hydrophilic (meth)acrylic monomer (MA)" and "monomer (MA)" are understood, for the purposes of the present invention, both in the plural and the singular, that is to say that they denote both one or more than one hydrophilic (meth)acrylic monomer (MA).

Non-limitative examples of hydrophilic (meth)acrylic monomers (MA) of formula (I) include, notably:
acrylic acid (AA)
(meth)acrylic acid,
hydroxyethyl(meth)acrylate (HEA),
2-hydroxypropyl acrylate (HPA),
hydroxyethylhexyl(meth)acrylate,
and mixtures thereof.

More preferably, the at least one hydrophilic (meth) acrylic monomer (MA) is acrylic acid (AA), hydroxyethylacrylate (HEA), or mixtures thereof.

In a preferred embodiment of the invention, in polymer (A) recurring units deriving from the hydrophilic (meth) acrylic monomer (MA) of formula (I) are comprised in an amount of from 0.1% to 3% by weight, preferably from 0.3 to 2% by weight, more preferably from 0.4 to 1.5% by weight with respect to the total weight of recurring units of polymer (A).

Recurring units deriving from the fluorinated comonomers (F) are preferably comprised in in polymer (A) in an amount of from 0.7 to 2.0% by weight with respect to the total weight of recurring units of polymer (A).

In a more preferred embodiment of the invention, polymer (A) comprises, preferably consist of:
from 8 to 20% by weight of recurring units deriving from the CTFE monomer,
from 0.4 to 1.5% by weight of recurring units deriving from hydrophilic (meth)acrylic monomer (MA) of formula (I),
from 0.7 to 2.0% by weight of recurring units deriving from comonomers (F),
the percentages by weight being with respect to the total weight of recurring units of polymer (A).

Determination of weight (average mole) percentage of monomer CTFE, monomer (MA), fluorinated comonomer (F) and VDF recurring units in polymer (A) can be performed by any suitable method, NMR being preferred.

By the term "fluorinated comonomer (F)", it is hereby intended to denote an ethylenically unsaturated comonomer comprising at least one fluorine atoms.

Non-limitative examples of suitable fluorinated comonomers (F) include, notably, the followings:
(a) $C_2$-$C_8$ fluoro- and/or perfluoroolefins such as tetrafluoroethylene (TFE), hexafluoropropylene (HFP), pentafluoropropylene and hexafluoroisobutylene;
(b) $C_2$-$C_8$ hydrogenated monofluoroolefins, such as 1,2-difluoroethylene and trifluoroethylene;
(c) perfluoroalkylethylenes of formula $CH_2=CH-R_{f0}$, wherein $R_{f0}$ is a $C_1$-$C_6$ perfluoroalkyl group;
(d) (per)fluoroalkylvinylethers of formula $CF_2=CFOR_{f1}$ wherein $R_{f1}$ is a perfluorinated alkyl group —$CF_3$ (perfluoromethylvinylether (PMVE)), —$C_2F_5$ (perfluoroethylvinylether (PEVE)), —$C_3F_7$ (perfluoropropylvinylether (PPVE)), —$C_4F_9$ or —$C_5F_{11}$ group,
(e) chloro- and/or bromo- and/or iodo-$C_2$-$C_6$ fluoroolefins.

The fluorinated comonomer (F) is preferably HFP or PMVE.

In a preferred embodiment of the present invention, polymer (A) is a VDF-CTFE-AA-HFP tetrapolymer. Preferably, the polymer (A) according to said preferred embodiment has an intrinsic viscosity of at least 0.10 l/g, and a second melting temperature $(T_{2f})$ of at least 130° C., preferably of at least 145° C., more preferably of at least 150° C.

In another preferred embodiment of the present invention, polymer (A) is a VDF-CTFE-HEA-HFP tetrapolymer. Preferably, the polymer (A) of said preferred embodiment has an intrinsic viscosity of at least 0.10 l/g, and a second melting temperature $(T_{2f})$ of at least 130° C., preferably of at least 145° C., more preferably of at least 150° C.

The second melting temperature $(T_{2f})$ is typically measured by differential scanning calorimetry (DSC) according to ASTM D 3418 standard method. In a second object of the present invention it is provided a process for the preparation of polymer (A) as above detailed.

The polymer (A) according to the present invention is typically obtainable by polymerization of a VDF monomer, at least one hydrogenated (meth)acrylic monomer (MA), a CTFE monomer and at least one comonomer (F), either in suspension, according to the procedures described, for example, in WO 2008/129041, or in emulsion, typically carried out as described in the art (see e.g. U.S. Pat. Nos. 4,016,345, 4,725,644 and 6,479,591).

The polymerization reaction is generally performed at temperatures of between 25 and 150° C., at a pressure of up to 130 bar.

Polymer (A) is typically provided in the form of powder.

Polymer (A) may be optionally further extruded to provide polymer (A) in the form of pellets.

Extrusion in the form of pellet can be advantageously carried out by melt extrusion.

The polymer (A) of the present application is particularly suitable for use in coating applications wherein the technique for the manufacture of the coating involves the use of a composition of said polymer into an organic solvent.

The role of the organic solvent in coating applications is typically to dissolve the polymer (A) in order to allow the application of the composition through brushing, spraying, dipping, rolling, spreading, and the like, the coating finally being then obtained upon evaporation of the organic solvent.

In a third object, the present invention provides a composition [composition (C)] comprising:
one or more polymer (A) of the invention, and
a liquid medium comprising one or more organic solvents.

The composition (C) of the invention typically comprises:
from 0.5% to 50% by weight, preferably from 1% to 30% by weight, more preferably from 5% to 20% by weight, with respect to the total weight of the composition (C), of one or more polymer (A) of the invention, and
from 99.5% to 50% by weight, preferably from 99% to 70% by weight, more preferably from 95% to 80% by weight, with respect to the total weight of the composition (C), of a liquid medium comprising one or more organic solvents.

The composition (C) of the invention is typically obtainable by dispersing or dissolving one or more polymer (A) of the invention in a liquid medium comprising one or more organic solvents.

The composition (C) of the invention is advantageously a homogenous solution.

The term "solution" is hereby intended to denote a clear homogeneous solution of polymer (A) as defined above in a liquid medium comprising one or more organic solvents.

The choice of the organic solvent is not particularly limited provided that it is suitable for solubilizing the polymer (A) of the invention at a temperature lower than 30° C.

The organic solvent is typically selected from the group consisting of:
alcohols such as methyl alcohol, ethyl alcohol and diacetone alcohol,
ketones, such as acetone, methylethylketone, methylisobutyl ketone, diisobutylketone, cyclohexanone and isophorone,
linear or cyclic esters such as isopropyl acetate, n-butyl acetate, methyl acetoacetate, dimethyl phthalate and γ-butyrolactone,
linear or cyclic amides such as N,N-diethylacetamide, N,N-dimethylacetamide, dimethylformamide and N-methyl-2-pyrrolidone, and
dimethyl sulfoxide.

The choice of non-toxic solvents in the preparation of polymer compositions is particularly suitable for use in the manufacture of components of secondary batteries such as those for portable devices or for electric cars, which is nowadays a market in constant increase.

Avoiding the use of toxic and polluting solvents in the preparation of components for secondary batteries allows eliminating cost for recovery and disposal and avoiding safety and environmental concerns related to handling of large volume of said solvents.

According to a preferred embodiment of the present invention, the organic solvent thus is a non-toxic solvent selected from the group consisting of:
alcohols such as methyl alcohol, ethyl alcohol and diacetone alcohol,
ketones, such as acetone, methylethylketone, methylisobutyl ketone, diisobutylketone, cyclohexanone and isophorone, and
linear or cyclic esters such as isopropyl acetate, n-butyl acetate, methyl acetoacetate, dimethyl phthalate and γ-butyrolactone.

More preferably, the organic solvent included in composition (C) is a ketone.

Very good results have been obtained when the ketone is a linear aliphatic ketone having a standard boiling point lower than 120° C., preferably lower than 100° C., more preferably lower than 70° C., preferably acetone.

The Applicant thinks, without this limiting the scope of the invention, that polymer (A) of the present invention, due to its peculiar composition, advantageously exhibits an improved solubility even at room temperature in non-toxic solvents such as alcohols, ketones and linear or cyclic esters.

A further object of the present invention is the use of the polymer (A) as above described or of the composition (C) as above detailed as binder for components of electrochemical devices, especially for forming electrodes of lithium batteries and/or electric double layer capacitors.

Should the polymer (A) be used as binder, especially for forming electrodes of lithium batteries, it possesses preferably an intrinsic viscosity of at least 0.15 l/g, more preferably of at least 0.25 l/g.

An electrode-forming composition may be obtained by adding and dispersing a powdery electrode material (an active substance for a battery or an electric double layer capacitor), and optional additives, such as an electroconductivity-imparting additive and/or a viscosity modifying agent, into the thus-obtained polymer (A) binder solution.

According to an embodiment of the present invention, a binder for components of lithium ion batteries is prepared by using a composition (C) that is a solution of the polymer (A) being VDF-CTFE-AA-HFP tetrapolymer including HFP in an amount preferably from 0.7 to 2.0% by weight with respect to the total weight of recurring units of polymer (A) dissolved in a ketone.

The polymer (A) and the composition (C) of the invention may be easily processed into films.

In a further object, the present invention thus provides a method for making a film comprising polymer (A), said method comprising processing, typically by casting, a composition (C) as above defined.

Casting generally involves solution casting, wherein typically a casting knife, a draw-down bar or a slot die is used to spread an even film of the composition (C) across a suitable substrate.

According to one aspect, the present invention provides a process for manufacturing a film comprising polymer (A), said process comprising:
(1a) providing the composition (C) of the invention, and
(2a) processing, typically by casting, the composition (C) provided in step (1a) into a film.

Under step (2a) of the process for manufacturing a film, casting generally involves solution casting, wherein typically a casting knife, a draw-down bar or a slot die is used to spread an even film of the composition (C) across a suitable substrate. The substrate may be a porous substrate or a non-porous substrate.

According to another aspect, the present invention provides a process for manufacturing a film comprising polymer (A) by processing a polymer (A) in the form of pellets and then compression molding the same.

The Applicant has surprisingly found that films comprising polymer (A) of the invention prepared by extrusion of polymer (A) in the form of pellets and then compression molded are characterized by considerable flexibility and transparency.

Films comprising polymer (A) obtainable as above defined are suitable for use in various applications.

Films comprising polymer (A) may be advantageously used for the manufacture of separators for electrochemical devices.

The separator for electrochemical devices of the invention typically comprises:
- at least one film comprising polymer (A), and
- optionally, adhered to said film, a substrate comprising one or more layers, preferably a porous substrate comprising one or more layers such as a porous substrate comprising at least one layer comprising at least one polyolefin.

Accordingly, under step (2a) of the process for manufacturing a film, casting the composition (C) across a polyolefin porous substrate provides a coated porous polyolefin separator for electrochemical devices, for lithium-ion batteries in particular.

According to a preferred embodiment of the present invention, a separator for a lithium-ion battery is prepared by using a composition (C) comprising polymer (A) that is a VDF-CTFE-HEA-HFP tetrapolymer including HFP in an amount preferably from 0.7 to 2.0% by weight with respect to the total weight of recurring units of polymer (A) dissolved in a ketone, said polymer (A) having an intrinsic viscosity comprised in the range from 0.05 and 0.45 l/g.

Furthermore, a more flexible separator coating tends to improve the contact with the electrodes avoiding zones of lack of contact between the separator and electrodes and then lowering the resistance of the interface Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXPERIMENTAL PART

Determination of Intrinsic Viscosity of Polymer (A)

Intrinsic viscosity ($\eta$) [dl/g] was measured using the following equation on the basis of dropping time, at 25° C., of a solution obtained by dissolving polymer (A) in N,N-dimethylformamide at a concentration of about 0.2 g/dl using a Ubbelhode viscosimeter:

$$[\eta] = \frac{\eta_{sp} + \Gamma \cdot \ln \eta_r}{(1 + \Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r$-1, and $\Gamma$ is an experimental factor, which for polymer (A) corresponds to 3.

General Preparation of VDF Copolymers

In a 4 liters reactor equipped with an impeller running at a speed of 650 rpm were introduced in sequence, demineralised water 2850 g and 0.6 g of Alkox® E-45 and 0.2 g of Methocell® K100 as suspending agent/kg Mni (initial amount of monomers fed to the reactor before the reaction). The reactor was purged with sequence of vacuum (30 mmHg) and purged of nitrogen at 20° C. Then, a 75% by weight solution of t-amyl-perpivalate in isododecane (TAPPI) was added; diethylcarbonate (DEC), the initial amount of monomer (MA), HFP, CTFE (and then about 1200 g of VDF were introduced into the reactor. The amounts of monomers and temperature conditions for preparing polymer A1, polymer A2, polymer A3, polymer A4 and comparative polymers 1 to 4 are specified in Table 1.

The reactor was gradually heated until a set-point temperature at 57° C. and the pressure was fixed at 120 bar. The pressure was kept constantly equal to 120 bar by feeding during the polymerization, the hydroxyethyl acrylate aqueous solution as shown in Table 1. After this feeding, no more aqueous solution was introduced and the pressure started to decrease. The polymerization was stopped by degassing the reactor until reaching atmospheric pressure. A conversion of VDF of about 80% was reached. The CTFE and monomer (MA) (HEA, AA or EA) were substantially all consumed and about half of the HFP remained non-reacted. The polymer so obtained was then recovered, washed with demineralised water and dried at 65° C. overnight.

TABLE 1

| Polymer | Initial CTFE w % | Initial HFP w % | Initial (MA) w % | TAPPI (g/kgMnT) | DEC (g/kgMnT) | HEA initial (g) ([HEA] in water solution, g) |
|---|---|---|---|---|---|---|
| Polymer 1 comp | 14 | 0 | HEA 0 | 3 | 41.7 | — |
| Polymer A1 | 14 | 2 | HEA 0.8 | 6 | 0 | 0.51 (5.76) |
| Polymer 2 comp | 5 | 2 | HEA 0.8 | 6 | 0 | 0.51 (5.76) |
| Polymer 3 comp | 14 | 0 | HEA 0.8 | 6 | 0 | 0.51 (5.76) |
| Polymer A2 | 9.5 | 2 | HEA 0.8 | 6 | 0 | 0.51 (5.76) |
| Polymer A3 | 14 | 2 | AA 0.5 | 6 | 12 | AA 0.32 (3.6) |
| Polymer A4 | 14 | 2 | EA 0.5 | 6 | 12 | EA 0.32 (3.6) |
| Polymer 4 comp | 14 | 2 | 0 | 3.5 | 18 | — |

MnT is the Total amount of monomers fed to the reactor.

Solubility Test

8% by weight compositions in acetone of each comparative polymer 1 to 4 and of polymers A1, A2, A3 and A4 were prepared. A clear and limpid solution at room temperature implies solubility at 25° C. of the polymer in acetone.

The compositions were tested also at 50° C. for evaluating solubility.

The results are summarized in Table 2.

TABLE 2

| Polymer | CTFE wt % | HFP wt % | (MA) wt % | $T_{2f}$ (°C) | Viscosity (g/l) | Solubility at 25° C. | Solubility at 50° C. |
|---|---|---|---|---|---|---|---|
| Polymer 1 comp | 14 | 0 | HEA 0 | 168.6 | / | NO | YES |
| Polymer A1 | 14 | 0.8 | HEA 0.8 | 155.3 | 0.115 | YES | YES |
| Polymer 2 comp | 5 | 0.8 | HEA 0.8 | 158.1 | 0.109 | NO | YES |
| Polymer 3 comp | 14 | 0 | HEA 0.8 | 160.5 | 0.118 | NO | NO |
| Polymer A2 | 9.5 | 0.8 | HEA 0.8 | 156.9 | 0.105 | YES | YES |
| Polymer A3 | 14 | 0.8 | AA 0.5 | 154.5 | 0.137 | YES | YES |
| Polymer A4 | 14 | 0.8 | EA 0.5 | 154.5 | 0.137 | YES | YES |
| Polymer 4 comp | 14 | 0.8 | 0 | 158.1 | 0.167 | NO | YES |

The results show that the polymers according to the invention, thanks to the concomitant presence of certain amounts of recurring units derived from CTFE, MA and of recurring units derived from HFP are soluble in acetone at room temperature. The same is not true for polymers having only recurrent units derived from CTFE and one of monomer MA or HFP or for polymers having a different amount of CTFE monomer.

Melt Extrusion and Pelletization of Comparative Polymer 1 and Polymers A1 and A2

Polymer 1 comp and polymers A1 and A2 were pelletized in a twin screw co-rotating extruder (Leistritz LSM 30.34 GG-5R having a screw diameter D of 34 mm) equipped with a main feeder. The extruder was set up to have six temperature controlled zones that permit to set the desired temperature profile as reported in Table 3. The die was composed of two holes having each a diameter of 4 mm. The extruder rotation speed was 100 rpm. The two extrudates were cooled in a water tank, pull out and then dried with compressed air. At the end, the two extrudates were cut-off in order to obtain the pellets.

TABLE 3

| | Zone | | | | | |
|---|---|---|---|---|---|---|
| | 1 | 2 | 3 | 4 | 5 | 6 |
| Temperature Profile [° C.] | 170 | 170 | 175 | 175 | 175 | 175 |

Mechanical Properties for Comparative Polymer 1 and Polymers A1 and A2.

Slabs recovered from compression moulded plaques obtained with pellets of comparative polymer 1 comp and polymers A1 and A2 were prepared. The plaques from polymers A1 and A2 looks more transparent than the one obtained from comparative polymer 1.

Mechanical tests at 23° C. and 50% relative humidity were carried out. The tensile tests were performed on 5 specimens according to ASTM D638 type V, 1 day after processing of the same. Instron 4301 dynamometer with 1 kN cell and knurled clamps was used.

The tests were carried out with a crosshead speed of 1 mm/min in the first section for the calculation of the module and then 50 mm/min until break. The results are shown in Table 4.

TABLE 4

| Sample | Modulus [MPa] | Yield Stress at max. [MPa] | Yield Strain at max. [%] | Stress at break [MPa] | Strain at break [%] |
|---|---|---|---|---|---|
| Polymer 1 comp | 373 | 16.4 | 8.9 | 14.4 | 103 |
| Polymer A1 | 159 | 10.5 | 16.3 | 25.7 | 583 |
| Polymer A2 | 374 | 19.2 | 10.6 | 33.0 | 490 |

The polymer A1 is much lower in modulus than comparative polymer 1. Furthermore, polymer A2 is similar to comparative polymer 1 in terms of modulus even having a much lower content of CTFE.

The invention claimed is:
1. A semi-crystalline vinylidene fluoride (VDF) copolymer [polymer (A)] comprising:
   (a) recurring units derived from vinylidene fluoride (VDF);
   (b) recurring units derived from chlorotrifluoroethylene (CTFE);
   (c) recurring units derived from at least one hydrophilic (meth)acrylic monomer (MA) of formula (I):

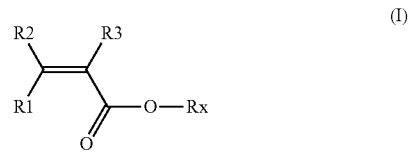

wherein each of RI, R2, R3, equal or different from each other, is independently an hydrogen atom or a $C_1$-$C_3$ hydrocarbon group, and Rx is a hydrogen or a $C_1$-$C_5$ hydrocarbon moiety optionally comprising at least one functional group; and
   (d) recurring units derived from one or more fluorinated comonomers (F) different from vinylidene fluoride and from chlorotrifluoroethylene;
   wherein the total amount of recurring units b) is between 6% and 25% by weight with respect to the total weight of recurring units of polymer (A) and the total amount of recurring units d) is between 0.5% and 4% by weight with respect to the total weight of recurring units of polymer (A),
   wherein polymer (A) comprises a heat of fusion of at least 0.4 J/g, as measured according to ASTM D 3418 and has an intrinsic viscosity, measured at 25° ° C. in N,N-dimethylformamide of at least 0.05 l/g.

2. The polymer (A) according to claim 1, having an intrinsic viscosity, measured at 25° C. in N,N-dimethylformamide of at most 0.50 l/g.

3. The polymer (A) according to claim 1, wherein monomer (MA) is selected from the group consisting of:
   acrylic acid (AA),
   (meth)acrylic acid,
   hydroxyethyl(meth)acrylate (HEA),
   2-hydroxypropyl acrylate (HPA),
   hydroxyethylhexyl(meth)acrylate,
   and mixtures thereof.

4. The polymer (A) according to claim 1, wherein the amount of monomer (MA) is from 0.1% to 3% by weight, with respect to the total weight of recurring units of polymer (A).

5. The polymer (A) according to claim 1, wherein comonomers (F) is selected from the group consisting of:
(a) $C_2$-$C_8$ fluoro- and/or perfluoroolefins;
(b) $C_2$-$C_8$ hydrogenated monofluoroolefins;
(c) perfluoroalkylethylenes of formula $CH_2=CH-R_{f0}$, wherein $R_{f0}$ is a $C_1$-$C_6$ perfluoroalkyl group;
(d) (per)fluoroalkylvinylethers of formula $CF_2=CFOR_{f1}$ wherein $R_{f1}$ is a perfluorinated alkyl group —$CF_3$ (perfluoromethylvinylether (PMVE)), —$C_2F_5$ (perfluoroethylvinylether (PEVE)), —$C_3F_7$ (perfluoropropylvinylether (PPVE)), —$C_4F_9$ or —$C_5F_{11}$ group, and
(e) chloro- and/or bromo- and/or iodo-$C_2$-$C_6$ fluoroolefins.

6. The polymer (A) according to claim 1, wherein comonomers (F) is HFP or PMVE.

7. The polymer (A) according to claim 1, which comprises:
from 8 to 20% by weight of recurring units deriving from the CTFE monomer,
from 0.4 to 1.5% by weight of recurring units deriving from hydrophilic (meth)acrylic monomer (MA) of formula (I),
from 0.7 to 2.0% by weight of recurring units deriving from comonomers (F),
the percentages by weight being with respect to the total weight of recurring units of polymer (A).

8. The polymer (A) according to claim 1 that is a VDF-CTFE-AA-HFP tetrapolymer.

9. The polymer (A) according to claim 1 that is a VDF-CTFE-HEA-HFP tetrapolymer.

10. A composition [composition (C)] comprising:
one or more polymer (A) according to claim 1, and
a liquid medium comprising one or more organic solvents.

11. The composition (C) according to claim 10, which comprises:
from 0.5% to 50% by weight, with respect to the total weight of the composition (C), of one or more polymer (A), and
from 99.5% to 50% by weight, with respect to the total weight of the composition (C), of a liquid medium comprising one or more organic solvents.

12. The composition (C) according to claim 10, wherein the organic solvent is selected from the group consisting of:
alcohols,
ketones, and
linear or cyclic esters.

13. A film comprising the polymer (A) of claim 1.

14. A process for making a film, said process comprising processing a composition (C) comprising the polymer (A) of claim 1 and a liquid medium comprising one or more organic solvents.

15. A process for making a film according to claim 13, said process comprising processing by extrusion, one or more polymer (A) in the form of pellets.

* * * * *